US008645308B2

(12) United States Patent
Furuya et al.

(10) Patent No.: US 8,645,308 B2
(45) Date of Patent: Feb. 4, 2014

(54) NON-TRANSITORY COMPUTER READABLE STORAGE MEDIUM, SOUND-VOLUME PREDICTION APPARATUS, AND SOUND-VOLUME PREDICTION METHOD

(75) Inventors: Hiroyuki Furuya, Kawasaki (JP); Atsushi Yamaguchi, Kawasaki (JP); Akihiro Otsuka, Kawasaki (JP); Akira Ueda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 270 days.

(21) Appl. No.: 13/213,616

(22) Filed: Aug. 19, 2011

(65) Prior Publication Data

US 2012/0066170 A1 Mar. 15, 2012

(30) Foreign Application Priority Data

Sep. 14, 2010 (JP) ................................ 2010-206066

(51) Int. Cl.
*G06N 5/02* (2006.01)

(52) U.S. Cl.
USPC ........................................................ 706/52

(58) Field of Classification Search
USPC ........................................ 702/45, 195, 703
See application file for complete search history.

(56) References Cited

U.S. PATENT DOCUMENTS

| | | | | |
|---|---|---|---|---|
| 6,278,958 | B1 * | 8/2001 | Lee et al. | 702/183 |
| 7,859,533 | B2 | 12/2010 | Kitayama et al. | |
| 7,891,464 | B2 * | 2/2011 | Tang et al. | 181/225 |
| 2002/0198690 | A1 | 12/2002 | Holzrichter et al. | |
| 2003/0208344 | A1 * | 11/2003 | Pollet et al. | 703/6 |
| 2005/0078835 | A1 * | 4/2005 | Baugh et al. | 381/61 |
| 2007/0107777 | A1 * | 5/2007 | Catron | 137/2 |
| 2007/0292261 | A1 * | 12/2007 | Tang et al. | 415/119 |
| 2011/0172936 | A1 * | 7/2011 | Hald et al. | 702/56 |
| 2012/0055735 | A1 * | 3/2012 | Lu et al. | 181/252 |
| 2012/0072132 | A1 * | 3/2012 | Furuya et al. | 702/45 |

FOREIGN PATENT DOCUMENTS

| | | |
|---|---|---|
| JP | 4-165900 | 6/1992 |
| JP | 8-123434 | 5/1996 |
| JP | 2001-108642 | 4/2001 |
| JP | 2006-287836 | 10/2006 |

OTHER PUBLICATIONS

Rindel J., The Use of Computer Modeling in Room Acoustics, Journal of Vibroengineering, 2000, No. 3(4) /Index 41-72, Paper of the International Conference Baltic-Acoustic 2000/ ISSN 1392-8716, pp. 219-224.*

(Continued)

*Primary Examiner* — Jeffrey A Gaffin
*Assistant Examiner* — Dave Misir
(74) *Attorney, Agent, or Firm* — Staas & Halsey LLP

(57) ABSTRACT

A sound-volume prediction apparatus acquires model information on an electronic device and positional information on an air intake section and/or an air-exhaust section of the electronic device. Furthermore, by using the model information and the positional information, the sound-volume prediction apparatus extends a sound ray that indicates a transmission route of sound generated by a sound source inside the electronic device toward the air-intake section and/or the air-exhaust section from the position of the sound source until the sound ray reaches the outside of the electronic device. The sound-volume prediction apparatus predicts sound transmission characteristics inside the electronic device by using geometric information on the flow path of the extended sound ray.

5 Claims, 7 Drawing Sheets

(56) References Cited

OTHER PUBLICATIONS

Xiangyang Z. et al., "On the accuracy of the ray-tracing algorithms based on various sound receiver models", Applied Acoustics, 64, 2003, pp. 433-441.*

Rindel, Jens Holger, *Computer Simulation Techniques for Acoustical Design of Rooms*, Acoustics Australia, vol. 23, No. 3, 1995, pp. 81-86.

Extended European Search Report, mailed Jan. 20, 2012, in corresponding European Application No. 11178615.8 (8 pp.).

* cited by examiner

NON-TRANSITORY COMPUTER READABLE STORAGE MEDIUM, SOUND-VOLUME PREDICTION APPARATUS, AND SOUND-VOLUME PREDICTION METHOD

CROSS-REFERENCE TO RELATED APPLICATIONS

This application is based upon and claims the benefit of priority of the prior Japanese Patent Application No. 2010-206066, filed on Sep. 14, 2010, the entire contents of which are incorporated herein by reference.

FIELD

The embodiments discussed herein are directed to a sound-volume prediction program, a sound-volume prediction apparatus, and a sound-volume prediction method.

BACKGROUND

Fans are often incorporated in conventional electronic devices to cool the electronic components included in the electronic devices. A fan incorporated in an electronic device reduces an electronic component's temperature that is generated due to the operation of the electronic device, the surrounding environment, or the like; thus, it is possible to avoid a failure of the electronic device due to heat or to protect a user from burn injuries, or the like, if he or she touches a high-temperature electronic device.

In recent years, the number of electronic components has increased because electronic devices have various functions, and pressure loss has increased in accordance with the reduced size of the electronic devices; therefore, the rotating speed of fans has been increased, which causes the problem of noise due to the operation sound of the fans. For electronic devices that need to be quietly operated, it is preferable that, in the design stage of the electronic devices, consideration is given to an appropriate cooling design, selection of a fan, control of the rotating speed of the fan, and the like.

In one mode for prediction of noise due to a fan in an electronic device, there is a method for predicting noise by using the no-load and rated rotating speeds that are provided by a fan maker, or the like, and by using a sound pressure level that is obtained at a position one meter away from the front face on the air-intake side. In another mode for prediction of noise due to a fan in an electronic device, there is a method for predicting noise on the basis of load noise at an operating point.

Recently, there has been a technology for conducting thermal analysis to predict the pressure difference between the front and back of a fan at an operating point and, by using load noise of the fan, PQ characteristics, or the like, predicting load noise and an air volume at an operating point. Furthermore, recently, there has been a technology for predicting noise that is transmitted to the end of a duct by an air blower. Moreover, in recent years, there has been a technology for drawing a sound ray that indicates the shortest transmission route from a noise source to a sound receiving point behind a wall and calculating distance attenuation, diffraction attenuation, and the like so as to predict noise at the sound receiving point.

Japanese Laid-open Patent Publication No. 2001-108642

Japanese Laid-open Patent Publication No. 08-123434

Japanese Laid-open Patent Publication No. 04-165900

Conventional technologies have a problem in that it is difficult to predict useful sound transmission characteristics inside an electronic device. Specifically, the technology for conducting thermal analysis to predict load noise at an operating point is not used for predicting sound transmission characteristics inside an electronic device. In the technology for predicting noise that is transmitted to the end of a duct, the shape of the duct, attenuation with respect to each arranged electronic component, and the like are measured in advance and manually input by a user. Because the shape of a duct and electronic components arranged in a newly-designed electronic device are different from conventional ones, large errors may occur if values that are measured using existing products are used.

Furthermore, in the technology for drawing a sound ray that is the shortest transmission route from a noise source to a sound receiving point, because distance attenuation and diffraction attenuation are calculated with respect to sound transmission characteristics inside a complicated electronic device, the amount of calculation is increased; therefore, the technology is not suitable for prediction of sound transmission characteristics inside an electronic device. Analysis tools, such as statistical energy analysis (SEA), finite element method (FEM), and boundary element method (BEM), are generally known. For such an analysis tool, a user is preferable to have high-level skills in order to create models, prepare a database in advance, and the like. It is needless to say that, if a user checks a cross-sectional drawing and sets a sound ray inside an electronic device, the amount of work for drawing the sound ray is increased as the number of fans and microphones are large.

SUMMARY

According to an aspect of an embodiment of the invention, a non-transitory computer readable storage medium having stored therein a sound-volume prediction program for a sound-volume prediction apparatus that predicts a volume of sound generated by a sound source inside an electronic device, the sound-volume prediction program causing the sound-volume prediction apparatus to execute a process includes extending, by using model information on the electronic device and positional information on an air-intake section and/or an air-exhaust section of the electronic device, a sound ray that indicates a transmission route of sound generated by the sound source toward the air-intake section and/or the air-exhaust section from a position of the sound source until the sound ray reaches outside of the electronic device; and predicting a sound transmission characteristic by using geometric information on a flow path of the extended sound ray.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. The present invention is not limited to the embodiments described below.

[a] First Embodiment

Configuration of a sound-volume prediction apparatus

Figure 1:
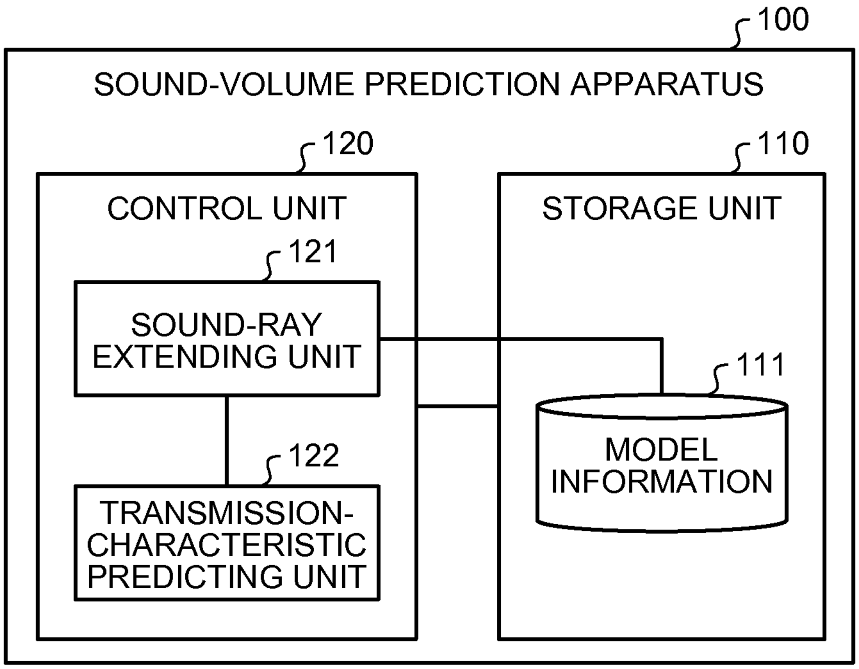
FIG. 1 is a diagram that illustrates the configuration example of a sound-volume prediction apparatus according to the present embodiment.

An explanation is given, with reference to FIG. 1, of the configuration of a sound-volume prediction apparatus according to the present embodiment. FIG. 1 is a diagram that illustrates the configuration example of the sound-volume prediction apparatus according to the present embodiment. For example, as illustrated in FIG. 1, a sound-volume prediction apparatus 100 includes a storage unit 110 and a control unit 120. The sound-volume prediction apparatus 100 predicts the volume of sound that is generated by a sound source inside an electronic device. In the following descriptions, an explanation is given by using a fan as an example of the sound source.

The storage unit 110 stores data used for various types of processing performed by the control unit 120 and various processing results obtained by the control unit 120 and includes model information 111. The storage unit 110 is, for example, a semiconductor memory device, such as a random access memory (RAM), read only memory (ROM), or flash memory, or storage such as a hard disk or optical disk.

The model information 111 stores information about an electronic device and various electronic components included in the electronic device. For instance, in addition to information about the shape or size of the electronic device, the model information 111 stores the names of various electronic components included in the electronic device, positional information on the electronic components in the electronic device, information about the shapes, sizes, and orientations of the electronic components, and the like. That is, in addition to information about the electronic device, the model information 111 includes information as to which electronic component is arranged in which orientation at which position in the electronic device, or the like.

The control unit 120 includes an internal memory that stores control programs, programs that define various procedures, or the like, and used data so as to control the overall sound-volume prediction apparatus 100. Furthermore, the control unit 120 includes a sound-ray extending unit 121 and a transmission-characteristic predicting unit 122. The control unit 120 is, for example, an integrated circuit, such as an application specific integrated circuit (ASIC) or field programmable gate array (FPGA), or an electronic circuit, such as a central processing unit (CPU) or a micro processing unit (MPU).

By using various types of model information stored in the model information 111 and positional information on an air-intake section and/or an air-exhaust section in the electronic device, the sound-ray extending unit 121 extends a sound ray that indicates a transmission route of sound generated due to the rotation of a fan. For instance, by using the positional information and the orientation of the fan included in the model information 111 and input positional information on the air-intake section and/or the air-exhaust section, the sound-ray extending unit 121 extends a sound ray toward the air-intake section and/or the air-exhaust section from the fan until the sound ray reaches the outside of the electronic device. The positional information on the air-intake section and the air-exhaust section may be pre-stored in the storage unit 110.

Figure 2:
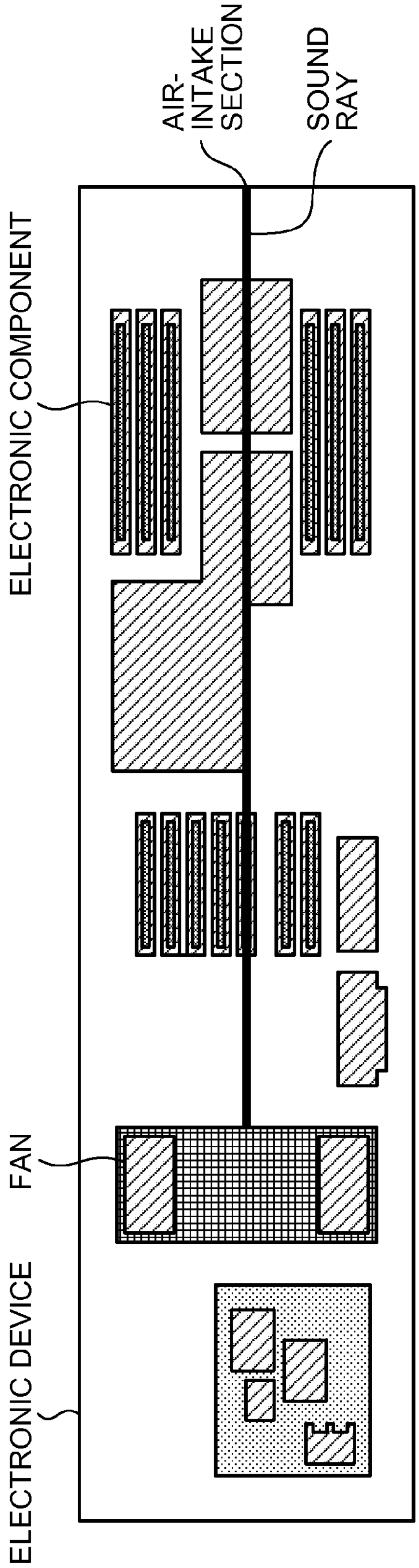
FIG. 2 is a diagram that illustrates extension of a sound ray performed by a sound-ray extending unit.

An explanation is given of the extension of a sound ray performed by the sound-ray extending unit 121 with reference to FIG. 2. FIG. 2 is a diagram that illustrates extension of a sound ray performed by the sound-ray extending unit 121. FIG. 2 illustrates the cross-sectional surface of the electronic device that includes the fan and various electronic components, and an explanation is given of the case where a sound ray is extended to the air-intake section.

For example, as illustrated in FIG. 2, by using information on the position, shape, size, and the like, of the fan included in the model information 111 and input positional information on the air-intake section, the sound-ray extending unit 121 extends a sound ray toward the air-intake section from the fan until the sound ray reaches the outside of the electronic device. At that time, the sound-ray extending unit 121 inflects the sound ray if an electronic component is present on the extended sound ray.

Figure 3A:
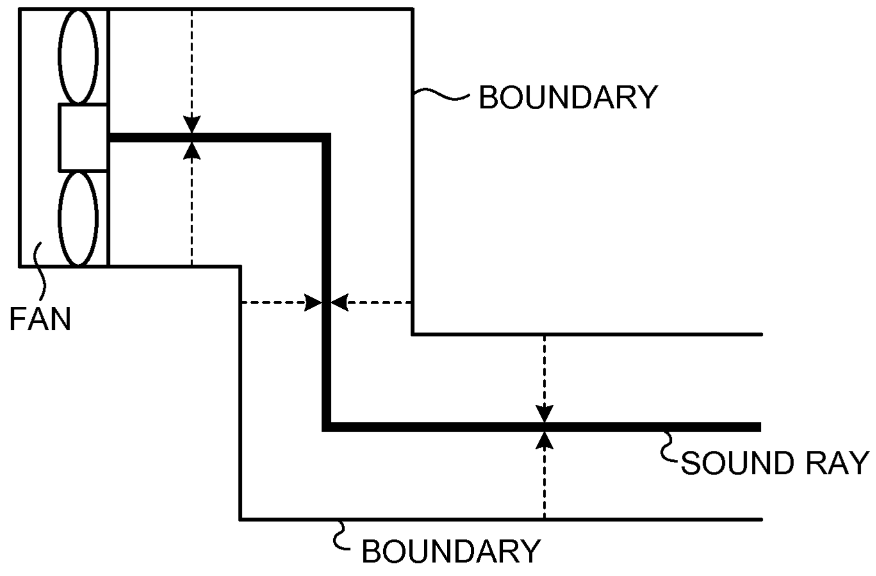
FIG. 3A is a diagram that illustrates an example where a sound ray is inflected.
Figure 3B:
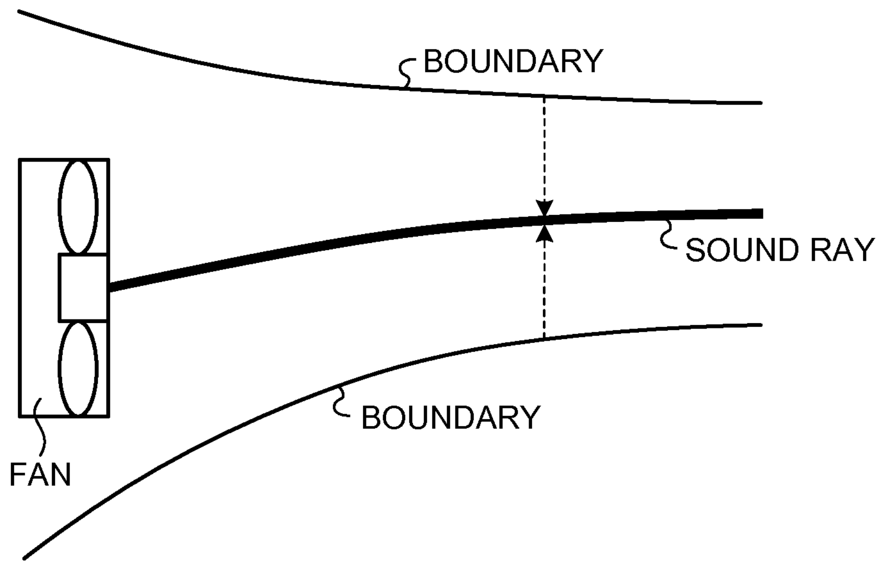
FIG. 3B is a diagram that illustrates an example where a sound ray is inflected.

An explanation is given of an example where a sound ray is inflected with reference to FIGS. 3A and 3B. FIGS. 3A and 3B are diagrams that illustrate examples where a sound ray is inflected. The electronic device and the electronic components other than the fan are not illustrated in FIGS. 3A and 3B, and the boundary between the inner surface of the electronic device or the outer surface of an electronic component and the flow path of the sound ray are illustrated.

For example, as illustrated in FIGS. 3A and 3B, if there are boundaries upon extension of the sound ray, the sound-ray extending unit 121 extends the sound ray toward the air-intake section and/or the air-exhaust section until the sound ray reaches the outside of the electronic device such that the sound ray passes near the middle of the boundaries. The sound-ray extending unit 121 determines the boundaries by using information on the position, size, and the like, of the electronic device and the electronic components included in the model information 111. Although the plane cross-sectional surface is illustrated in FIGS. 3A and 3B for ease of explanation, a sound ray can be inflected in all directions toward the air-intake section and/or the air-exhaust section from the position of the fan.

Figure 4:
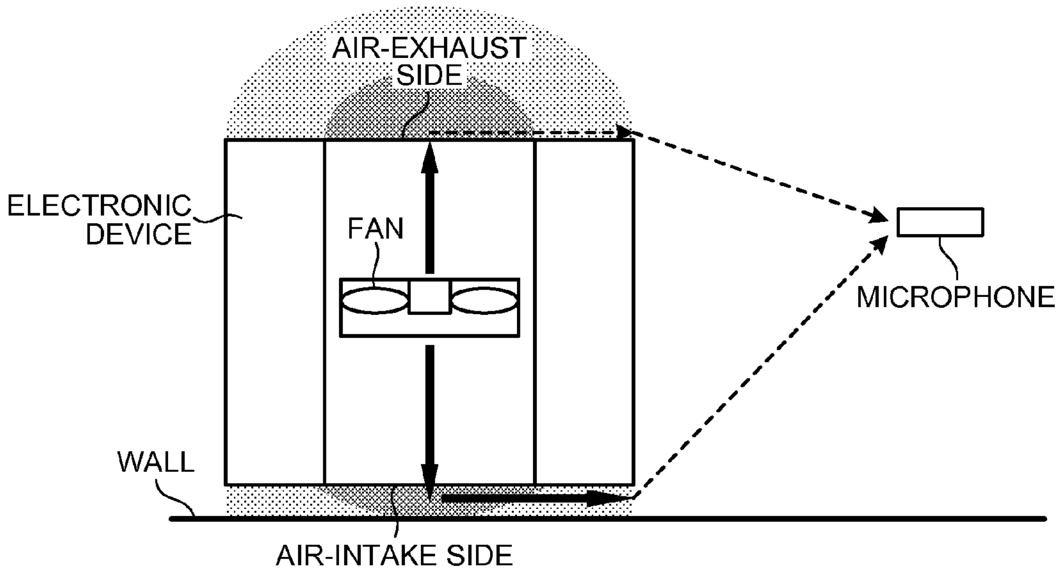
FIG. 4 is a diagram that illustrates an example of a sound ray if there is a wall near the outside of an electronic device.

If there is a wall outside the electronic device, the sound-ray extending unit 121 regards the space between the electronic device and the wall as the inside of the electronic device and extends the sound ray until it reaches the position where the wall is not present. An explanation is given, with reference to FIG. 4, of a sound ray in a case where there is a wall near the outside of the electronic device. FIG. 4 is a diagram that illustrates an example of a sound ray if there is a wall near the outside of the electronic device.

FIG. 4 illustrates a case where there is a wall on the air-intake side of the fan of the electronic device. The shading on the air-exhaust side and the air-intake side illustrated in FIG. 4 represents a range of sound, and the darker shading indicates the higher sound level. Furthermore, the microphone illustrated in FIG. 4 measures sound. A solid arrow indicates a sound ray inside the electronic device, and a dashed arrow indicates a sound ray outside the electronic device.

For instance, as illustrated in FIG. 4, if the distance between the air-intake section and a wall, such as a floor surface, is less than a predetermined distance, the sound-ray extending unit 121 extends the sound ray toward the microphone, which measures sound, such that the sound ray passes near the middle of the positions of the electronic device and the floor surface and until the sound ray becomes equal to or more than the predetermined distance. The position of the wall, the position of the microphone, and the like, to be used is pre-stored in the storage unit 110 or input to the sound-volume prediction apparatus 100. If there is a plurality of air-intake sections and/or air-exhaust sections, the position of each air-intake section and/or air-exhaust section is input.

Figure 5:
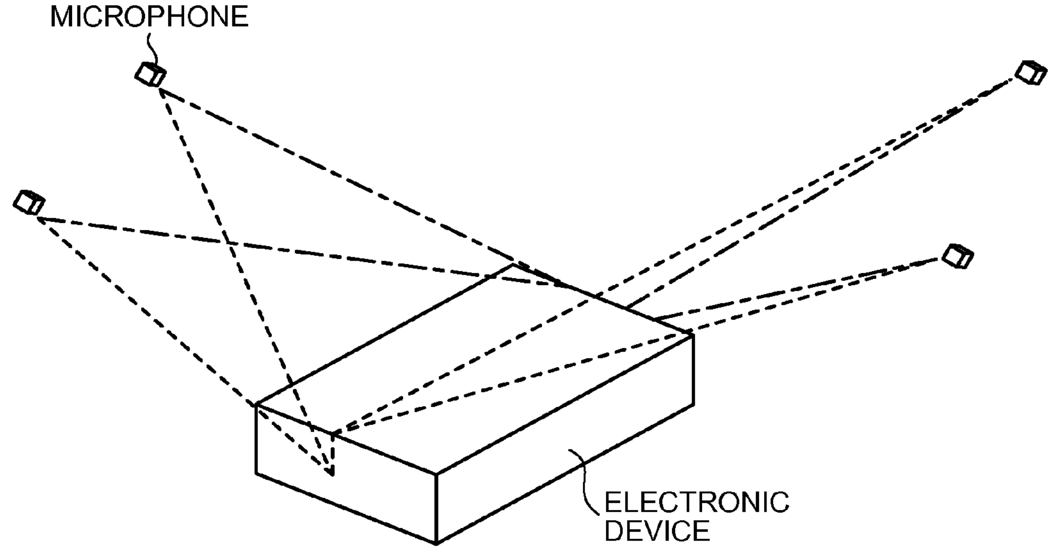
FIG. 5 is a diagram that illustrates an example of sound rays outside an electronic device.

An explanation is given of a sound ray outside an electronic device with reference to FIG. 5. FIG. 5 is a diagram that illustrates an example of sound rays outside the electronic device. The electronic device illustrated in FIG. 5 is a rectangular cuboid and includes an air-intake section and an air-exhaust section that are located on one end and the other end, respectively, of the electronic device in the longitudinal direction. Specifically, in FIG. 5, for example, a sound ray indicated by a dash line is extended from the air-intake section to an arbitrary microphone, and a sound ray indicated by a dashed-dotted line is extended from the air-exhaust section to an arbitrary microphone.

For example, as illustrated in FIG. 5, by using the positional information on a microphone, the sound-ray extending unit 121 extends the sound ray, which is extended to the air-intake section and/or the air-exhaust section, such that the sound ray reaches the microphone over the shortest distance. The sound ray outside the electronic device may be extended by using any method.

Refer back to the explanation of FIG. 1. The transmission-characteristic predicting unit 122 predicts sound transmission characteristics on the basis of geometric information on the flow path of the sound ray extended by the sound-ray extending unit 121. For example, the transmission-characteristic predicting unit 122 determines the length of the sound ray extended by the sound-ray extending unit 121 inside the electronic device.

At that time, if the shape of the sound ray is inflected, the transmission-characteristic predicting unit 122 determines the inflection angle while determining the length of the sound ray. If the shape of the sound ray is inflected, the sound intensity may be attenuated; therefore, the transmission-characteristic predicting unit 122 determines the inflection angle. Furthermore, if a plurality of sound rays can be drawn, i.e., if there is a plurality of sound routes inside the device, the transmission-characteristic predicting unit 122 divides sound energy in accordance with the cross-sectional area of the flow path through which each sound ray passes, the orientation of the cross-sectional surface, and the like, at the position where the sound rays are branched, and applies the sound transmission characteristic that is predicted for each sound ray so as to determine the sound volume at the end of the electronic device. Then, the transmission-characteristic predicting unit 122 adds up energy of all the sound rays so as to predict the sound volume of all the sound rays. If the main sound ray is distinct and if the other sound rays have low sound transmission on their routes, a sound ray to be used for transmission characteristic prediction may be limited to, for example, a sound ray with the shortest distance or a sound ray with the smallest number of inflections out of the sound rays extended by the sound-ray extending unit 121. The specification for a sound ray to be used may be changed as appropriate.

Furthermore, for example, the transmission-characteristic predicting unit 122 determines the cross-sectional area and the filling rate of the flow path of a sound ray inside the electronic device so as to predict sound transmission characteristics. Specifically, the transmission-characteristic predicting unit 122 determines the average cross-sectional area, the smallest cross-sectional area, the filling rate, and the like, for each space through which a sound ray passes inside the electronic device and, by using the determined length of a sound ray, the cross-sectional area, the filling rate, the inflection angle, and the like, predicts sound transmission characteristics with respect to each frequency for each sound ray. The average cross-sectional area indicates, for example, the average of all the cross-sectional areas of spaces. The smallest cross-sectional area indicates, for instance, the cross-sectional area of the narrowest portion of a flow path. The transmission-characteristic predicting unit 122 uses an arbitrary mathematical formula to predict transmission characteristics.

Figure 6:
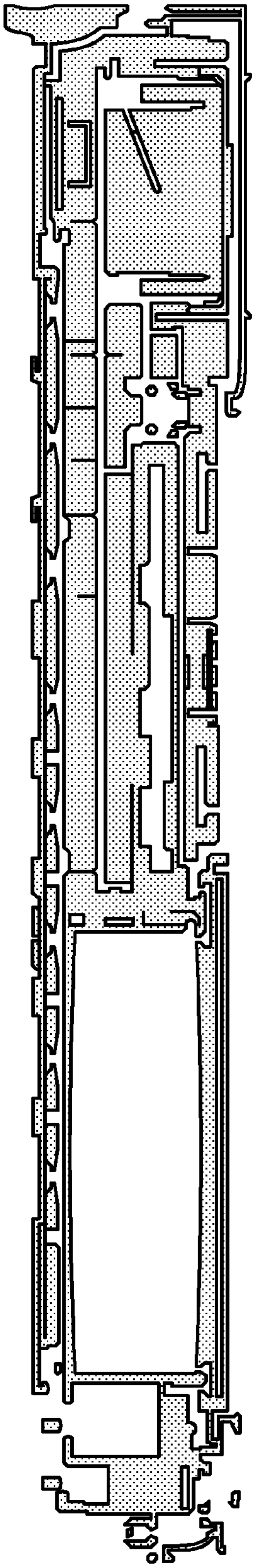
FIG. 6 is a diagram that illustrates an example of extraction of spaces inside an electronic device for calculation of a filling rate.

An explanation is given, with reference to FIG. 6, of the extraction of spaces inside the electronic device for the calculation of a filling rate. FIG. 6 is a diagram that illustrates an example of the extraction of spaces inside the electronic device for the calculation of a filling rate. In FIG. 6, a mobile terminal, such as a mobile phone, is used as an example of an electronic device. The shading areas indicate spaces, the blank areas indicate electronic components, and solid lines indicate the outer circumferences of the electronic components. For example, by using model information, the transmission-characteristic predicting unit 122 extracts the volume of the spaces inside the electronic device illustrated in FIG. 6 and the volume of the electronic components so as to determine the filling rate of the electronic components.

Figure 7A:
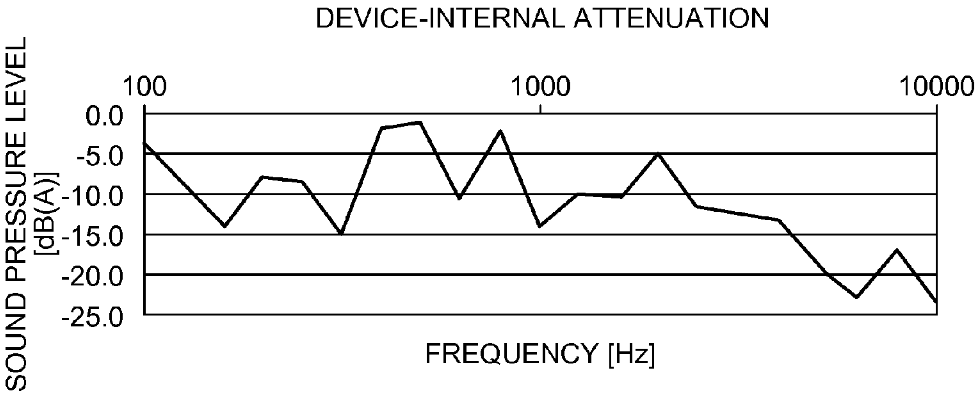
FIG. 7A is a graph that illustrates an example of device-internal attenuation that is a sound transmission characteristic inside a device, such as an electronic device.
Figure 7B:
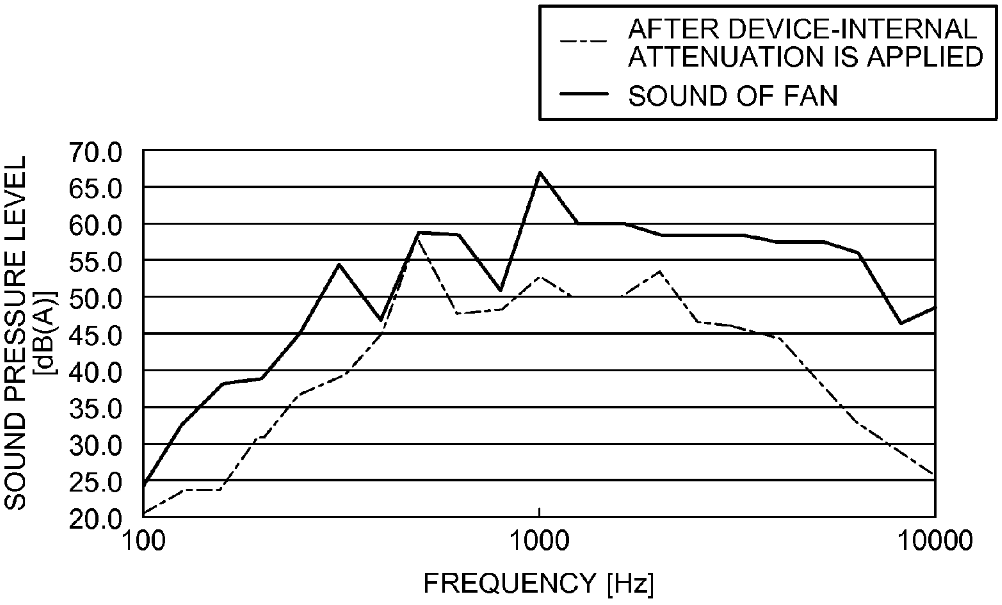
FIG. 7B is a graph that illustrates an example that is obtained after application of the device attenuation that is a sound transmission characteristic inside a device, such as an electronic device.

An explanation is given, with reference to FIGS. 7A and 7B, of sound transmission characteristics inside a device, such as an electronic device. FIG. 7A is a graph that illustrates an example of device-internal attenuation that is a sound transmission characteristic inside a device, such as an electronic device. FIG. 7B is a graph that illustrates an example that is obtained after application of the device attenuation that is a sound transmission characteristic inside a device, such as an electronic device.

In FIGS. 7A and 7B, each vertical axis indicates a sound pressure level (dB (A)), and each horizontal axis indicates a frequency (Hz). FIG. 7A indicates the attenuation inside the device; thus, the sound pressure level is the difference between the sound pressure level obtained at the position of the fan and the sound pressure level obtained at the air-intake section or the air-exhaust section that reaches the outside of the electronic device.

In FIG. 7B, the solid line indicates the sound pressure level of the fan with respect to each frequency, and the dashed-dotted line indicates a transmission characteristic that is a sound pressure level obtained after the device-internal attenuation is applied. Specifically, the transmission characteristic obtained after application of the device-internal attenuation as indicated by the dashed-dotted line in FIG. 7B is a transmission characteristic that is obtained by applying, to the sound of the fan indicated by the solid line, various types of geometric information that includes the device-internal attenuation as illustrated in FIG. 7A.

After predicting the transmission characteristics inside the electronic device as described above, the sound-volume prediction apparatus 100 predicts the sound volume (noise) in the electronic device by using, for example, the predicted transmission characteristics and transmission characteristics outside the electronic device such as load noise and air volume at an operating point that is obtained using thermal analysis software, or the like. For such a prediction of the sound volume, if there is a plurality of fans in the electronic device, a sound pressure level is determined with respect to all the fans or a sound pressure level is determined with respect to each fan.

Sound-Volume Prediction Process

Figure 8:
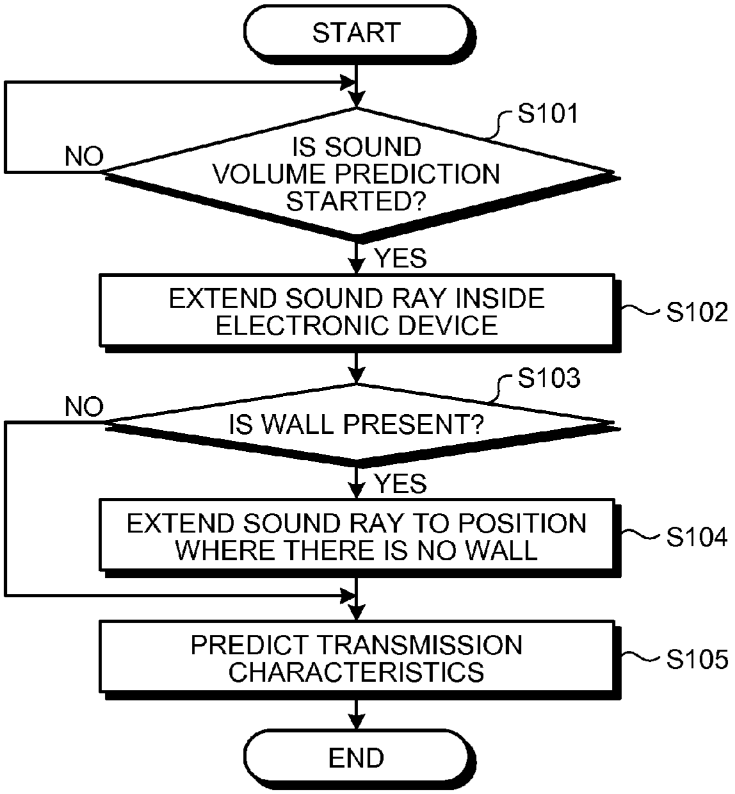
FIG. 8 is a flowchart that illustrates an example of the flow of a sound-volume prediction process according to the present embodiment.

Next, an explanation is given of a sound-volume prediction process according to the present embodiment with reference to FIG. 8. FIG. 8 is a flowchart that illustrates an example of the flow of the sound-volume prediction process according to the present embodiment.

For example, as a trigger for the start of sound volume prediction as illustrated in FIG. 8, a user, or the like, performs a predetermined operation related to the start of sound volume prediction and inputs positional information, or the like, on the air-intake section and/or the air-exhaust section of the electronic device. When the positional information is input (Yes at Step S101), the sound-volume prediction apparatus 100 extends, by using the positional information and model information, the sound ray toward the air-intake section and/or the air-exhaust section from the fan until the sound ray reaches the outside of the electronic device (Step S102). At that time, the sound-volume prediction apparatus 100 inflects the sound ray if an electronic component is present on the extended sound ray.

Next, the sound-volume prediction apparatus 100 determines whether there is a wall outside the electronic device by using positional information, which is stored in the storage unit 110 or input, on the air-intake section and/or the air-exhaust section, a wall, a microphone, or the like (Step S103). At that time, if the sound-volume prediction apparatus 100 determines that there is a wall outside the electronic device because, for example, the distance between the air-intake section and/or the air-exhaust section and the wall is less than a predetermined distance (Yes at Step S103), the sound-volume prediction apparatus 100 extends the sound ray to a position where there is no wall, i.e., until the distance becomes equal to or more than the predetermined distance (Step S104). If the sound-volume prediction apparatus 100 determines that there is no wall (No at Step S103), the process at Step S105 is performed.

Afterward, the sound-volume prediction apparatus 100 determines the length of the extended sound ray inside the electronic device, the cross-sectional area and the filling rate of the flow path of the sound ray, the lengths of the short and long sides of the exit of the flow path, or the like so as to predict sound transmission characteristics (Step S105). For prediction of transmission characteristics, if the shape of a sound ray is inflected, the sound-volume prediction apparatus 100 determines an inflection angle and uses it for the prediction of sound transmission characteristics. Furthermore, after determining the transmission characteristics inside the electronic device, the sound-volume prediction apparatus 100 calculates distance attenuation, directionality, sound reflected by the floor, diffraction attenuation, or the like, with respect to sound transmission characteristics outside the electronic device so as to predict a sound volume (noise) that is output from the electronic device. Furthermore, the sound-volume prediction apparatus 100 may output, to an arbitrary device, sound transmission characteristics inside the electronic device so that the arbitrary device predicts a sound volume output from the electronic device.

Advantages According to the Embodiment

As described above, the sound-volume prediction apparatus 100 extends the sound ray that indicates a sound transmission route inside the electronic device and predicts sound transmission characteristics inside the electronic device by using various types of geometric information on the sound ray. As a result, in comparison to a conventional technology that predicts transmission characteristics without considering electronic components that are present inside an electronic device, the sound-volume prediction apparatus 100 can predict useful sound transmission characteristics inside an electronic device. Furthermore, the sound-volume prediction apparatus 100 extends, by using geometric information, a sound ray from a sound source, such as a fan, inside an electronic device to the position of an arbitrary microphone outside the electronic device; therefore, in comparison to a conventional technology where a user checks a cross-sectional drawing, or the like, so as to set a sound ray, it is possible to reduce the amount of work. Moreover, the sound-volume prediction apparatus 100 does not require high-level skills for advance preparation and usage as described above; therefore, in comparison to a case where analysis tools such as SEA, FEM, and BEM are used, transmission characteristics can be easily predicted.

[b] Second Embodiment

An explanation is given so far of the embodiment of a mobile terminal device disclosed in the present application; however, the present invention may be embodied in various different forms other than the above-described embodiment. Different embodiments are explained in (1) device configuration and (2) programs.

(1) Device Configuration

The procedures, the control procedures, the specific names, and the information including various types of data, parameters, and the like as described in the above specifications and the drawings can be arbitrarily changed except as otherwise noted. Each of the components of the sound-volume prediction apparatus 100 depicted in the drawings is based on a functional concept and does not necessarily need to be physically configured as depicted in the drawings. Specific forms of separation and integration of each device are not limited to the one depicted in the drawings. It is possible that all or some of them are functionally or physically separated or integrated in an arbitrary unit depending on various types of loads or usage.

(2) Programs

Figure 9:
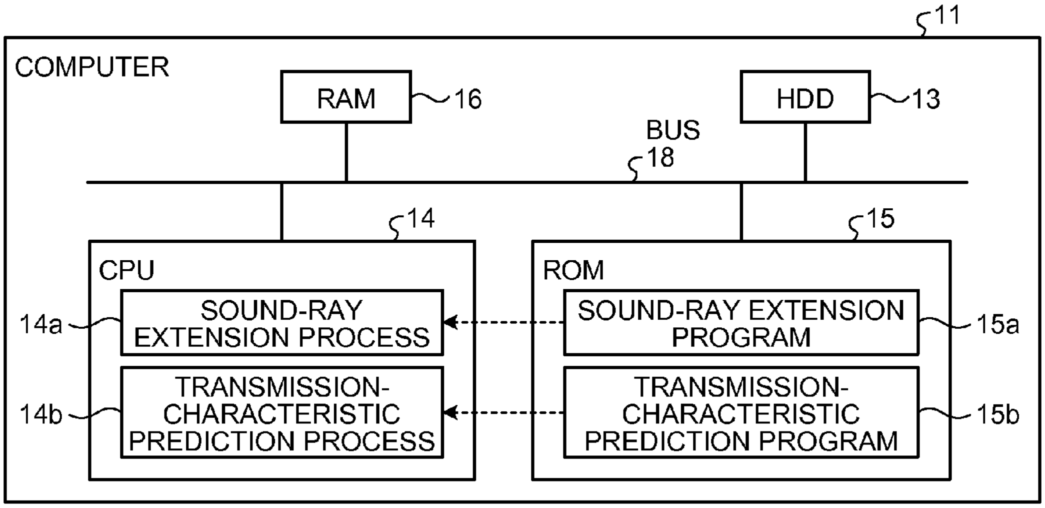
FIG. 9 is a diagram that illustrates an example of a computer that executes a sound-volume prediction program.

In the above-described embodiment, an explanation is given of a case where various processes are performed using hardware logic; however, these processes may be performed by executing prepared programs on a computer. In the following descriptions, an explanation is given, with reference to FIG. 9, of an example of a computer that executes a sound-volume prediction program that has the same function as the sound-volume prediction apparatus 100 described in the above embodiment. FIG. 9 is a diagram that illustrates an example of a computer that executes the sound-volume prediction program.

As illustrated in FIG. 9, a computer 11 that serves as the sound-volume prediction apparatus 100 includes an HDD 13, a CPU 14, a ROM 15, a RAM 16, and the like that are connected to one another via a bus 18.

The ROM 15 pre-stores the sound-volume prediction program that has the same function as the sound-volume prediction apparatus 100 described in the above embodiment. Specifically, as illustrated in FIG. 9, the ROM 15 pre-stores a sound-ray extension program 15*a* and a transmission-characteristic prediction program 15*b*. The sound-ray extension program 15*a* and the transmission-characteristic prediction program 15*b* may be integrated or separated as appropriate in the same manner as each component of the sound-volume prediction apparatus 100 illustrated in FIG. 1.

The CPU 14 reads the sound-ray extension program 15*a* and the transmission-characteristic prediction program 15*b* from the ROM 15 for execution. Thus, as illustrated in FIG. 9, the sound-ray extension program 15*a* and the transmission-characteristic prediction program 15*b* function as a sound-ray extension process 14*a* and a transmission-characteristic prediction process 14*b*. The sound-ray extension process 14*a* and the transmission-characteristic prediction process 14*b* correspond to the sound-ray extending unit 121 and the transmission-characteristic predicting unit 122 illustrated in FIG. 1. The CPU 14 executes a sound-volume prediction program by using data such as model information stored in the RAM 16.

The sound-ray extension program 15*a* and the transmission-characteristic prediction program 15*b* may not necessarily be stored initially in the ROM 15. For example, each program may be stored in a "portable physical medium", such as a flexible disk (FD), a CD-ROM, a DVD disk, a magneto-optical disk, or an IC card, that is inserted into the computer 11. Each program may be stored in, for example, a "fixed physical medium", such as an HDD, that is arranged inside or outside the computer 11. Moreover, each program may be stored in "another computer (or server)", or the like, that is connected to the computer 11 via, for example, a public line, the Internet, a LAN, a WAN, or the like. The computer 11 may read each program from it and execute the program.

According to one embodiment of a sound-volume prediction program, a sound-volume prediction apparatus, and a sound-volume prediction method disclosed in the present application, an advantage is produced such that it is possible to predict useful sound transmission characteristics inside an electronic device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer readable storage medium having stored therein a sound-volume prediction program for a sound-volume prediction apparatus that predicts a volume of sound generated by a sound source inside an electronic device, the sound-volume prediction program causing the sound-volume prediction apparatus to execute a process comprising:

extending, by using model information on the electronic device and positional information on an air-intake section and/or an air-exhaust section of the electronic device, a sound ray that indicates a transmission route of sound generated by the sound source toward the air-intake section and/or the air-exhaust section from a position of the sound source until the sound ray reaches outside of the electronic device;

determining a length and a shape of the extended sound ray and a cross-sectional area and a filling rate of a flow path of the sound ray so as to predict a sound transmission characteristic; and predicting a sound transmission characteristic by using geometric information on a flow path of the extended sound ray.

2. The non-transitory computer readable storage medium having stored therein the sound-volume prediction program according to claim 1, the sound-volume prediction program causing the sound-volume prediction apparatus to execute a process further comprising, if there is a wall near the outside of the electronic device, extending the sound ray until the sound ray reaches a position where the wall is not present while regarding a space between the electronic device and the wall as inside of the electronic device.

3. The non-transitory computer readable storage medium having stored therein the sound-volume prediction program according to claim 1, the sound-volume prediction program causing the sound-volume prediction apparatus to execute a process further comprising, if a shape of the extended sound ray is inflected, determining an inflection angle while determining a length of the sound ray.

4. A sound-volume prediction method performed by a sound-volume prediction apparatus that predicts a volume of sound generated by a sound source inside an electronic device, the sound-volume prediction method comprising:

extending, by using model information on the electronic device and positional information on an air-intake section and/or an air-exhaust section of the electronic device, a sound ray that indicates a transmission route of sound generated by the sound source toward the air-intake section and/or the air-exhaust section from a position of the sound source until the sound ray reaches outside of the electronic device;

determining a length and a shape of the extended sound ray and a cross-sectional area and a filling rate of a flow path of the sound ray so as to predict a sound transmission characteristic; and predicting a sound transmission characteristic by using geometric information on a flow path of the extended sound ray.

5. A sound-volume prediction apparatus that predicts a volume of sound generated by a sound source inside an electronic device, the sound-volume prediction apparatus comprising:

a processor; and a memory, wherein the processor executes:

extending, by using model information on the electronic device and positional information on an air-intake section and/or an air-exhaust section of the electronic device, a sound ray that indicates a transmission route of sound generated by the sound source toward the air-intake section and/or the air-exhaust section from a position of the sound source until the sound ray reaches outside of the electronic device;

determining a length and a shape of the extended sound ray and a cross-sectional area and a filling rate of a flow path of the sound ray so as to predict a sound transmission characteristic; and predicting a sound transmission characteristic by using geometric information on a flow path of the extended sound ray.

* * * * *